March 22, 1966     A. BLOCK ETAL     3,241,267
ABRASIVE DEVICE AND METHOD OF FABRICATION
Filed Sept. 26, 1963     5 Sheets-Sheet 1
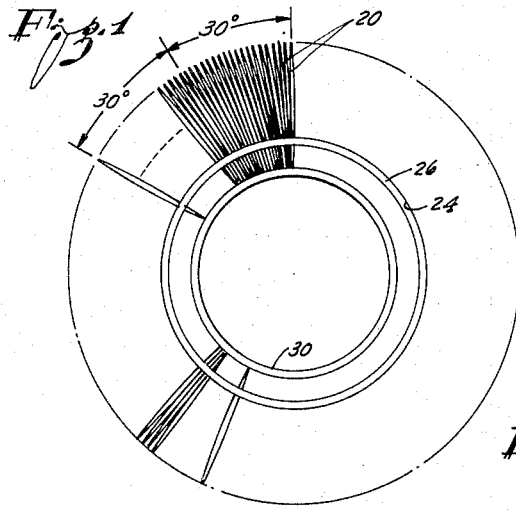
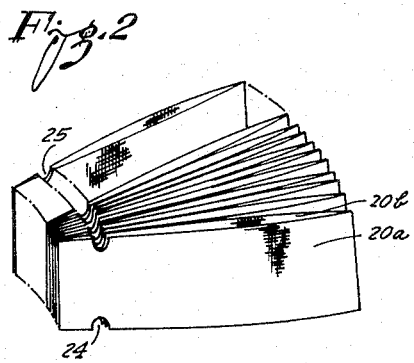
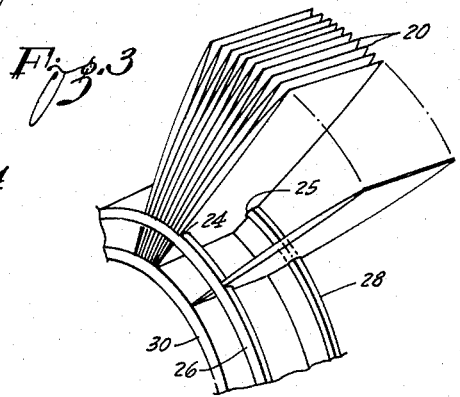
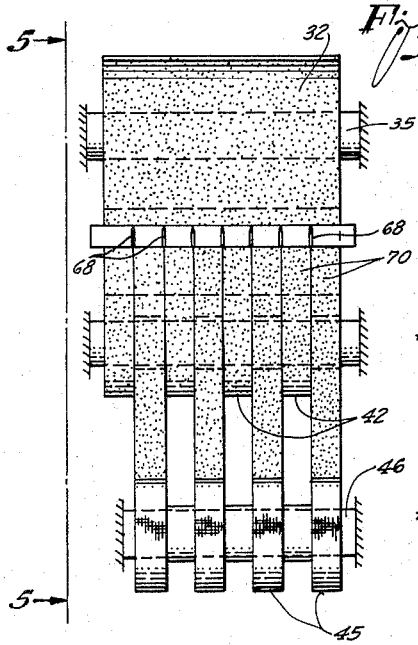
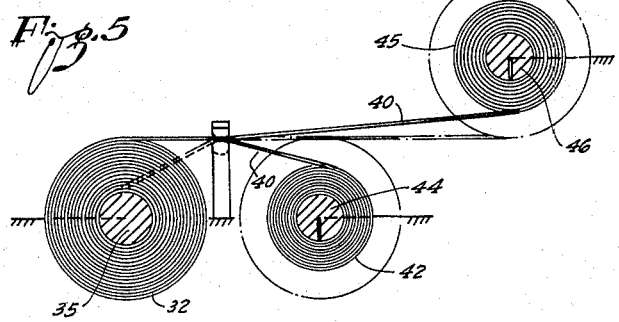
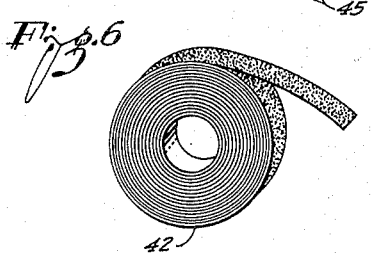
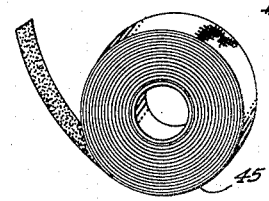
INVENTORS:
Aleck Block
Robert M. Nelson
Attorneys March 22, 1966 A. BLOCK ETAL 3,241,267
ABRASIVE DEVICE AND METHOD OF FABRICATION
Filed Sept. 26, 1963 5 Sheets-Sheet 2
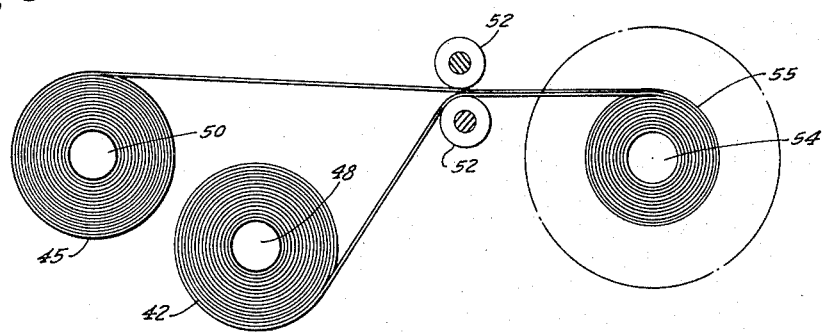
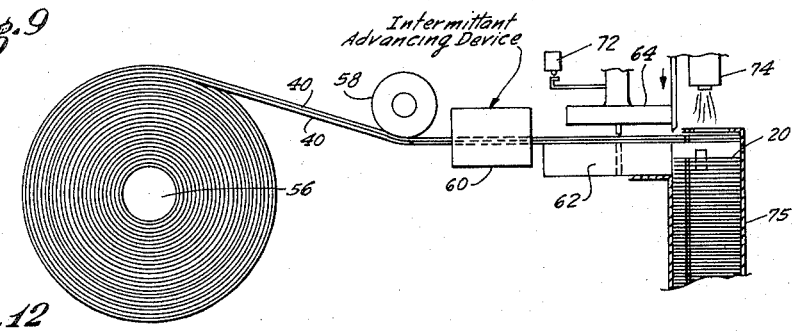
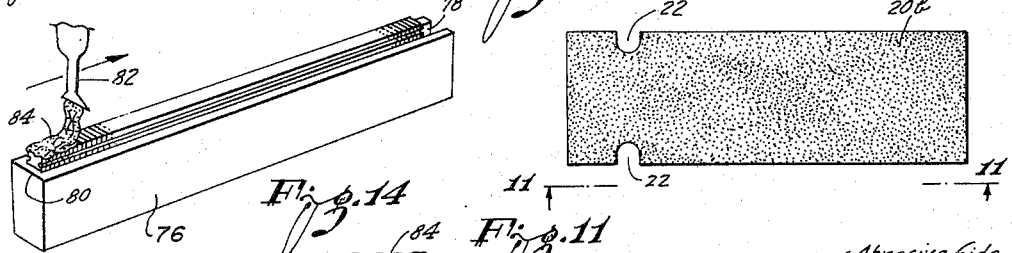
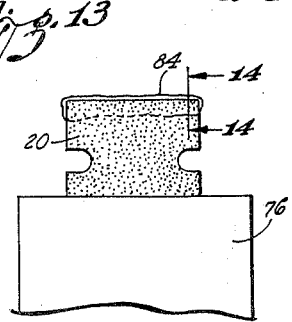
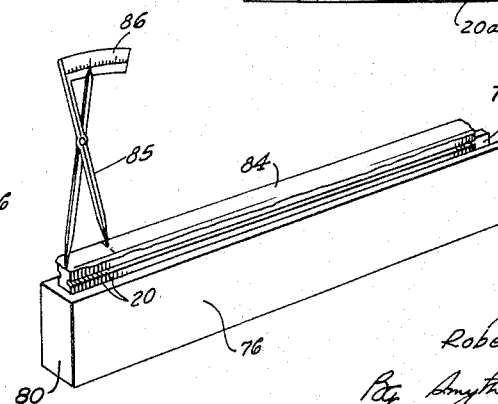
INVENTORS:
Aleck Block
Robert M. Nelson
Attorneys

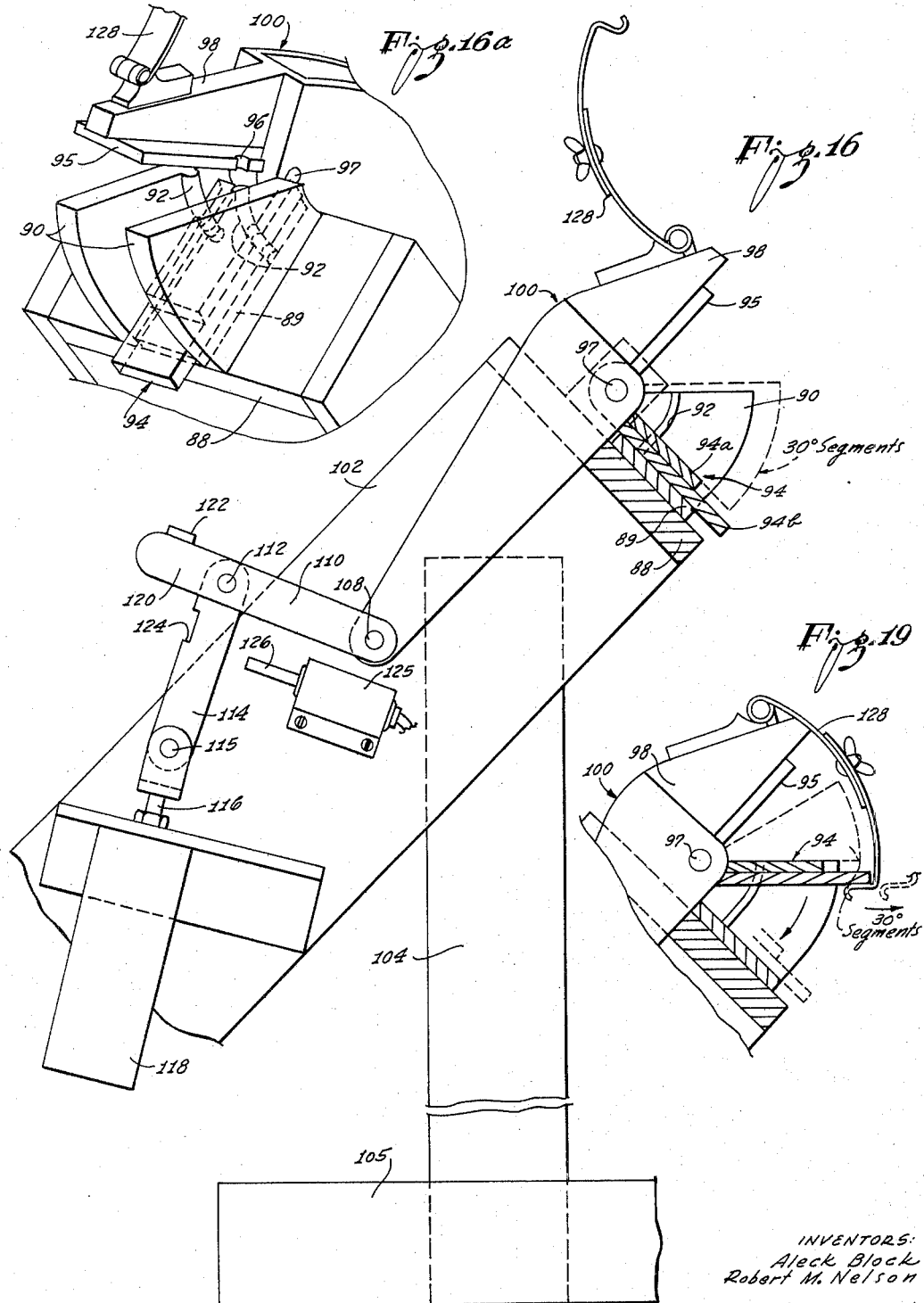

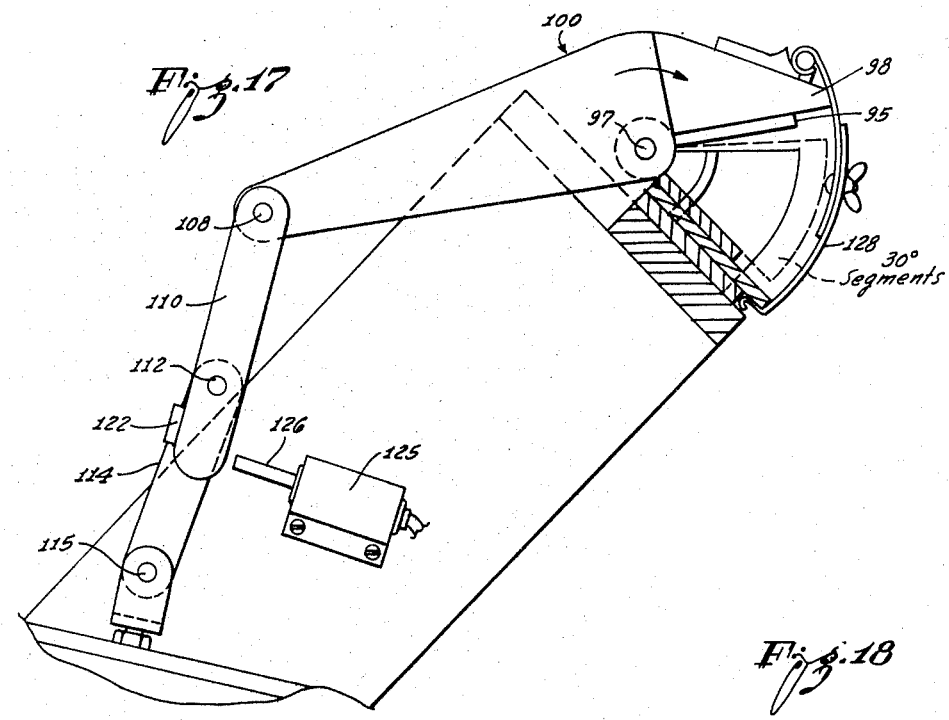
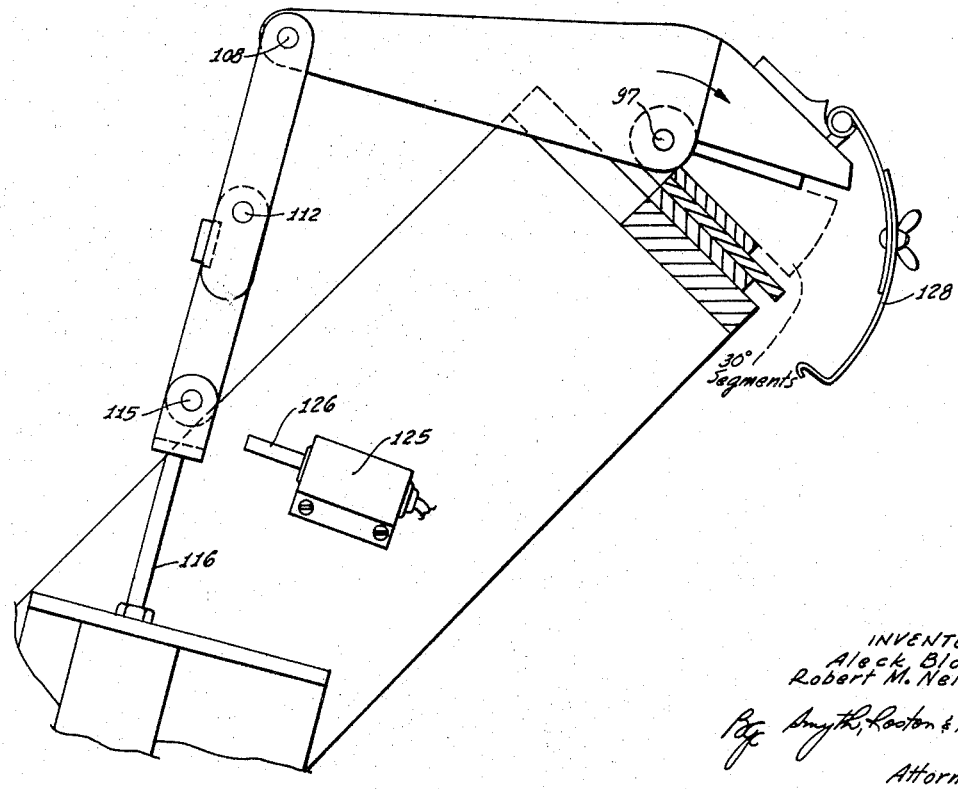

March 22, 1966  A. BLOCK ETAL  3,241,267
ABRASIVE DEVICE AND METHOD OF FABRICATION
Filed Sept. 26, 1963
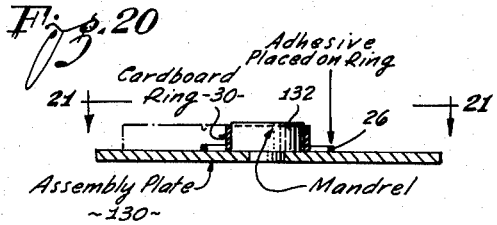
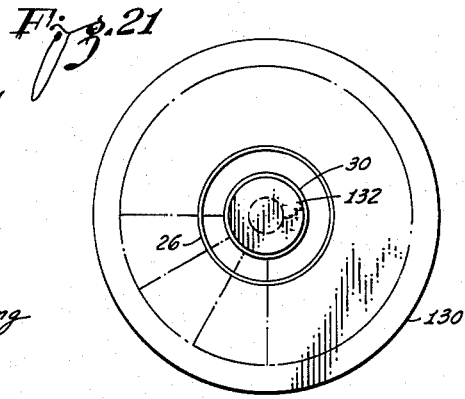
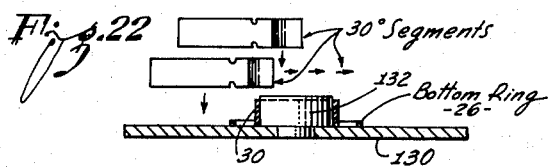
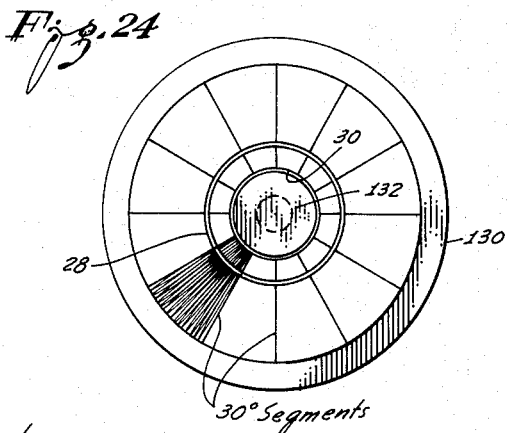
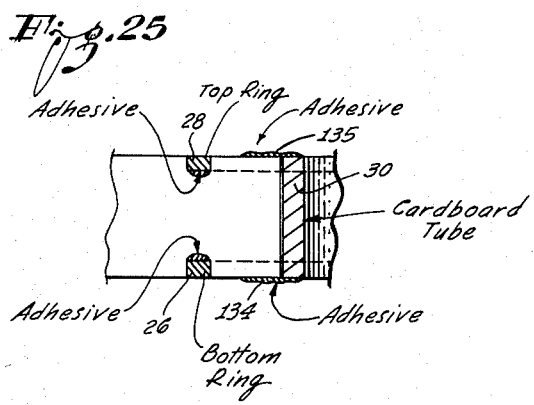
INVENTORS:
Aleck Block
Robert M. Nelson
Attorneys

United States Patent Office 3,241,267
Patented Mar. 22, 1966

---

3,241,267
ABRASIVE DEVICE AND METHOD OF
FABRICATION
Aleck Block, Los Angeles, and Robert M. Nelson, Glendale, Calif., assignors to Merit Products, Inc., Los Angeles, Calif., a corporation of California
Filed Sept. 26, 1963, Ser. No. 311,896
16 Claims. (Cl. 51—336)

This invention relates to a flap-type abrasive device comprising an annulus of radially positioned flexible leaves with abrasive particles on one face of each leaf.

In the actual operation of such a rotary abrasive device, the outer end portions of the leaves successively contact a workpiece with a slapping and wiping action that requires spacing between the outer ends of the successive leaves. On the other hand, maximum efficiency for saving time requires that as many abrasive leaves as possible be packed together into the annulus to contact the workpiece on each revolution of the device. It follows that the most efficient flap-type abrasive device should have a certain minimum spacing between the outer ends of the abrasive leaves, but nevertheless the total number of leaves should be as large as possible without eliminating the required slapping action.

A certain difficulty arises, however, because if the abrasive leaves of an annular array are packed snugly together at the inner circumference of the annulus, the outer ends of the leaves are spread apart by greater than the minimum spacing required for maximum efficiency. Thus, a number of leaves equal to the inner circumference of the annulus divided by the thickness of one leaf is too few for maximum efficiency at the outer circumference of the annulus. If the abrasive leaves are relatively long, say, 3 inches long as compared to 2 inches long, the excessive spacing between the outer ends of the successive leaves is increased for even further reduction in efficiency.

The present invention meets this difficulty by circumferentially compressing the annular array of abrasive leaves in the region of the inner circumference of the array to accommodate a greater number, for example, 20 percent greater, than the number that equals the inner circumference of the annulus divided by the initial thickness of the individual leaves. The circumferential compression of the inner end portions of the leaves of the annulus array may be accomplished in various ways in various practices of the invention. In the presently preferred practice of the invention disclosed herein, the leaves of the annulus are divided into segments, for example, twelve segments; the segments are compressed individually; and then the compressed segments are assembled and bonded together to form a complete rotary abrasive device.

One practice of the invention involves the further concept of making such an annular array of abrasive leaves of relatively large diameter when the abrasive leaves are relatively long, the increased diameter compensating to a substantial extent for the fact that for a given inside diameter the outer ends of relatively long leaves are spaced further apart than the outer ends of relatively short leaves. The advantage of making the annular array relatively large in diameter may be understood by comparing an annulus of 2 inches inside diameter and 8 inches outside diameter with an annulus of 4 inches inside diameter and 10 inches outside diameter, both being made up of abrasive leaves 3 inches long. The ratio between the outer circumference and the inner circumference of the smaller annulus is approximately 4.0, whereas the ratio between the outer circumference and the inner circumference of the larger annulus is only 2.5. Thus, the outer ends of the 3 inch abrasive leaves are spread apart much less by the geometry of the larger annulus than by the geometry of the smaller annulus; and, therefore, the larger annulus requires less compression of the segments to achieve optimum spacing of the outer ends of the 3 inch leaves.

The presently preferred practice of the invention teaches further concepts relating to the method of fabricating such an annular array of abrasive leaves. Among these concepts are: the use of progressive dies to form the abrasive leaves with die-cut notches in the leaves to facilitate anchoring the leaves in the annular assembly; the biasing of the leaves to longitudinal curvature with the leaves arranged in successive pairs of oppositely bowed leaves whereby the leaves tend automatically to distribute themselves equally around the circumference of the annulus; the use of the notches in the sides of the abrasive leaves for two different purposes, first to keep the leaves of a segment of the annulus in arcuate alignment during the operation of compressing the segment and, second, to form circumferential grooves in the annulus to seat reinforcement rings; the production of the abrasive leaves in oppositely bowed pairs by advancing two ribbons of the abrasive sheet material step by step through progressive dies; and the use of special apparatus to precompress the segments both effectively and uniformly.

The various features and advantages of the invention will be understood from the following detailed description together with the accompanying drawings.

In the drawings, which are to be regarded as merely illustrative:

FIG. 1 is a side elevation of a selected embodiment of the invention;

FIG. 2 is a perspective view of one of the precompressed segments, with some of the leaves omitted for clarity of illustration;

FIG. 3 is a fragmentary perspective view of the embodiment of the invention shown in FIG. 1, showing how a pair of reinforcement rings engage notches in the opposite edges of the abrasive leaves;

FIG. 4 is a simplified plan view of an arrangement for cutting ribbons of abrasive material from a relatively wide sheet of the abrasive material;

FIG. 5 is a side elevational view of the arrangement shown in FIG. 4 as seen along the line 5—5;

FIG. 6 is a perspective view of a roll of the abrasive ribbon with the abrasive side of the ribbon facing radially outwardly;

FIG. 7 is a perspective view of a roll of the abrasive ribbon with the abrasive side of the ribbon facing radially inwardly of the roll;

FIG. 8 is a simplified elevational view showing how the two rolls of abrasive ribbon shown in FIGS. 6 and 7 may be combined in a single composite roll of two layers of the ribbon;

FIG. 9 is a simplified side elevational view showing how the composite roll of two layers of the ribbon is fed to progressive die means for producing pairs of oppositely bowed abrasive leaves;

FIG. 10 is a plan view of a pair of oppositely bowed leaves;

FIG. 11 is an elevational view of the pair of oppositely bowed leaves as seen along the line 11—11 of FIG. 10;

FIG. 12 is a perspective view showing how the pairs of oppositely bowed leaves may be packed together in a long holder with the notched ends of the leaves exposed for processing in preparation for forming precompressed segments of an annulus;

FIG. 13 is an enlarged fragmentary end elevational view of the arrangement shown in FIG. 12;

FIG. 14 is an enlarged section taken along the line 14—14 of FIG. 13 and indicating how adhesive spread on the pack of leaves in FIG. 12 penetrates into the spaces between the successive leaves;

FIG. 15 is a perspective view showing how caliper means may be used to measure off a pack of the leaves to be processed for forming a segment of the finished product;

FIG. 16 is a side elevational view, partly in section, showing an apparatus that may be employed to compress a pack of the abrasive leaves, thereby to form a compressed segment of an annulus, the apparatus being shown in its initial open position;

FIG. 16a is a fragmentary perspective view of the jaws of the apparatus;

FIG. 17 is a fragmentary view similar to FIG. 16 showing the apparatus loaded with a pack of the abrasive leaves in preparation for the compression operation that changes the pack into a compressed segment of an annulus;

FIG. 18 is a similar view of the apparatus at the end of the actual compression of the pack of leaves;

FIG. 19 is a similar view of the apparatus showing how a hook member lifts the lower jaw of the apparatus to facilitate removal of a compressed segment;

FIG. 20 is a sectional view showing how an assembly plate equipped with a cylindrical mandrel may be used to assemble together the segments of an annulus;

FIG. 21 is a plan view of the structure shown in FIG. 20 as seen along the line 21—21;

FIG. 22 is a diagrammatic view similar to FIG. 20 showing how the compressed segments are assembled in sequence;

FIG. 23 is a view similar to FIG. 22 with all of the segments assembled, the view indicating how a reinforcement ring is introduced into a circular groove in the face of the annulus;

FIG. 24 is a plan view of the completed annulus on the assembly plate; and

FIG. 25 is an enlarged radial section of the completed annulus showing the construction in the region of the inner circumference of the annulus.

In the drawings, which illustrate the presently preferred practice of the invention, FIG. 1 shows an annulus or annular array of radially positioned abrasive leaves 20, which is adapted for mounting in a well-known manner on a driven rotary hub structure (not shown) for the purpose of processing workpieces. While such an annulus may be of various dimensions, in this particular instance the annulus has an outside diameter of 10 inches and an inside diameter at the inner ends of the abrasive leaves of 3⅞ inches, the length of each abrasive leaf being 3 1/16 inches.

FIG. 2 is a perspective view of the precompressed segments of the annulus and indicates how, with all of the abrasive surfaces of the leaves facing in the same circumferential direction, the leaves are arranged in oppositely bowed pairs of leaves. Thus, each pair comprises an abrasive leaf 20a, which is biased to longitudinal curvature with the abrasive particles on the concave face of the leaf, and a second abrasive leaf 20b, which is biased to longitudinal curvature with the abrasive particles on the convex face of the leaf. It can be seen in FIGS. 2 and 3 that the oppositely bowed pairs of leaves exert pressure against each other by virtue of their inherent resiliency, whereby the abrasive leaves tend to be uniformly spaced apart.

As best shown in FIG. 10, each of the abrasive leaves 20 is formed with a pair of notches 22 in its opposite edges near its inner or root end. FIG. 2 shows how the notches 22 form concentric grooves 24 and 25 on the opposite sides of each of the compressed segments. When the segments are assembled together to form an annulus, the arcuate grooves 24 and 25 form corresponding circular grooves in which corresponding metal reinforcement rings are firmly seated.

FIG. 3 shows in a fragmentary manner two reinforcement rings 26 and 28 on the opposite sides of the annulus, and FIG. 1 shows how a reinforcement ring 26 fits snugly into a corresponding circular groove 24.

The abrasive leaves that form the annulus are held together in their assembled positions in three ways. In the first place, the two reinforcement rings 26 and 28 engage the leaves in the manner described; in the second place, the inner end portions of the abrasive leaves are not only compressed together but are also bonded together by a suitable adhesive; and in the third place, the inner ends of the abrasive leaves are adhesively bonded to a cylindrical cardboard core 30.

In the presently preferred practice of the invention, the pairs of oppositely bowed abrasive leaves are first fabricated from abrasive sheet material in the manner indicated by FIGS. 4 to 9; and then the pairs of abrasive leaves are packed together in a form or jig and coated with adhesive in the manner indicated by FIGS. 12 to 14; individual packs are measured off as shown in FIG. 15 for the purpose of forming the packs into compressed segments of an annulus; the measured packs are compressed arcuately in a special device as shown in FIGS. 16 to 19 inclusive; the compressed segments are assembled in the manner shown in FIGS. 20 to 22 inclusive to form an annulus; and finally, the two reinforcement rings are installed, and adhesive is added to complete the final product as in the manner indicated by FIGS. 23 to 25.

FIGS. 4 and 5 show how the fabrication procedure may, if desired, start with a roll 32 several inches wide of fabric with a coating 34 of abrasive particles on the outer face of the rolled fabric. The roll 32 is mounted on a suitable shaft or axle 35, and the sheet material with its abrasive face uppermost is led through cutting means 36 having a plurality of rotary knives 38 that cut the fabric into a plurality of ribbons 40. One set of the ribbons 40 is wound into a plurality of rolls 42 on a shaft 44, and an alternate set of the ribbons is wound into rolls 45 on a second shaft 46. As can be seen in FIG. 5, the ribbons are wound in opposite directions on the two shafts 44 and 46, so that the abrasive side of the ribbon is outermost on each roll 42, as shown in FIG. 6, and the abrasive side is turned inward on each roll 45, as may be seen in FIG. 7. It is required that the ribbons on the two sets of rolls be permanently set or biased to the opposite curvatures. In some instances, merely winding the ribbons in the opposite directions suffices to set the ribbons to the required opposite curvatures, but it is usually desirable to subject each of the wound rolls to heat temporarily to soften the plastic adhesive of the ribbons to set the ribbons to the opposite curvatures.

FIG. 8 shows how a ribbon roll 42 may be mounted on a shaft 48, and an oppositely wound ribbon roll 45 may be mounted on a second shaft 50, with the two ribbons brought face to face by a pair of guide rollers 52 and the two ribbons wound on a shaft 54 to make a composite roll 55. The abrasive faces of both of the ribbons are turned inwardly of the composite roll 55, but it is apparent that the two ribbons are biased to opposite curvature.

FIG. 9 illustrates the next step, in which the composite roll 55 is mounted on a shaft 56, and the two face-to-face ribbons are led under a guide roll 58 to a device 60 which intermittently grips the two ribbons and advances the two ribbons by a distance equal to the desired length of the finished leaves. The intermittent device 60 feeds the two ribbons into a set of dies comprising a lower fixed die 62 and an upper reciprocating die 64. The upper die 64 carries a pair of punches 65 on its opposite sides which enter recesses 66 on the opposite sides of the roller die 62 for the purpose of cutting the two previously mentioned notches 22 on the opposite side of each abrasive leaf. The upper die 64 is further provided with a knife blade 68 which cooperates with the lower die 62 to sever successive pairs of abrasive leaves.

When the upper reciprocating die 64 descends and cuts off a pair of abrasive leaves, the two punches 65 cut out the notches 22 for the next pair of leaves. When the upper die 64 then returns to its upper position, a finger 70 that moves with the upper die contacts a switch 72 to close a circuit for operation of the intermittent advancing device 60. When each pair of leaves is severed from the two ribbons, an air jet from a nozzle 74 moves the severed leaves downward into a container 75. Thus, the container 75 becomes filled with a stack of pairs of leaves of the character shown in FIGS. 10 and 11, the abrasive faces of the two leaves being turned in the same direction and the two leaves being oppositely bowed. As shown in FIG. 11, the concave sides of the two leaves confront each other, but it will be readily appreciated that the convex sides may confront each other if desired.

FIG. 12 shows a jig or holder 76 which provides a long channel 78 of the width of the abrasive leaves 20 and of a depth somewhat less than the length of the leaves. The stacked leaves from the container 25 are transferred to the channel 78 of the holder and are packed against an end wall 80 of the holder with the inner or notched ends of the abrasive leaves uppermost and exposed above the channel. With the leaves packed snugly together, a dispensing device 82 is employed to spread a layer 84 of a suitable adhesive on the base ends of the packed leaves. The adhesive material may, for example, be a suitable epoxy resin of the type commonly employed for this general purpose. As indicated in an exaggerated manner in FIG. 14, the adhesive material is of sufficiently thin viscosity to penetrate between the base ends of the leaves by capillary attraction and thus cause the base ends of the leaves to be bonded together face to face.

The next step is to measure off a portion of the adhesively coated packed leaves to serve as a segment of the final annulus. It has been found convenient to measure off a segment equivalent to one-twelfth of the annulus. The number of leaves in each pack will exceed by at least 10 percent the number that is equal to one-half of the inner circumference of the annulus divided by the initial thickness of the leaves. The excess may be as high as 20 percent in some instances. As shown in FIG. 15, an adjustable caliper device 85 provided with an arcuate scale 86 may be employed to measure off the segments.

FIGS. 16 to 19 indicate the construction of a power-actuated device which has been employed successfully to compress a measured pack of leaves to form a segment of an annulus. As best shown in FIGS. 16 and 16a, the apparatus provides a jaw structure which includes a lower fixed base plate 88, a narrow liner 89 fixedly mounted on the base plate, a pair of side plates 90 fixedly mounted on the base plate and formed with arcuate guide ribs 92 on their inner faces, a lower movable jaw 94, and an upper movable jaw 95 having a pair of notches 96 to clear the arcuate ribs 92.

The lower movable jaw 94 comprises two plates 94a and 94b bonded together and is hingedly mounted on a cross pin 97. The upper movable jaw 94 is carried by an upper arm 98 of a lever 100 that is pivotally mounted on the same cross pin 97. The upper movable jaw 94 is carried by an upper arm 98 of a lever 100 that is pivotally mounted on the same cross pin 97. The fixed base plate 88 with its narrow liner 89 is mounted on a pair of inclined frame members 102, which, in turn, are mounted on a pair of stanchions which extend upward from a base 105. The lever 100 is centrally located between the two inclined frame members 102, and the lower arm 106 of the lever is connected by a pivot 108 to a link 110. An intermediate point of the link 110 is connected by a pivot 112 to a lower link 114. The lower link 114 is connected by a pivot 115 to a piston rod 116 that extends upward from an inclined pneumatic power cylinder 118.

When the link 110 is turned downward in the position shown in FIG. 16, one end 120 of the link extends beyond the pivot 112, and this end is provided with a stop member 122 which is located and dimensioned to cooperate with a notch 124 in the lever 14. When the lever 100 is turned upward, as shown in FIGS. 18 and 19, the stop member 122 nests into the notch 124 to limit relative rotation of the two links 110 and 114 about the pivot 112. It is to be noted in FIGS. 18 and 19 that the upper pivot 108 that connects the upper link 110 to the lever 100 is "past center" with respect to alignment with the two lower pivots 112 and 115, so that the two links 110 and 114 function, in effect, as a single rigid link in response to thrust by the piston rod 116.

Mounted on one of the two inclined side frame members 102 is a small air cylinder 125, from which extends a piston rod or plunger 126. When the two links 110 and 114 are extended, as shown in FIG. 18, the air cylinder 125 may be operated to cause the plunger 126 to thrust against the lower link 114 to collapse the two links 110 and 114 and return the links to the angular positions shown in FIG. 16.

Preferably, the upper arm 98 of the lever 100 pivotally carries an adjustable arcuate hook member 128 which is adapted to engage the lower jaw 94 at the end of a compression operation for the purpose of lifting the lower jaw in the manner indicated in FIG. 17. The lifting of the lower jaw 94 lifts the compressed segment to a position for convenient removal of the segment from the apparatus.

With the parts of the apparatus positioned as shown in FIG. 16, a measured pack of abrasive leaves 20 is taken from the holder 76 before the adhesive on the pack hardens, and the pack is placed in the jaws of the apparatus with the notches of the leaves engaging the two arcuate ribs 92 and with the pack resting on the lower jaw 94. The lever 100 is then manually turned to the position shown in FIG. 17 to place the upper jaw 95 in position to compress the pack of leaves, and the hook member 128 is swung from the retracted position shown in FIG. 16 to the lower position shown in FIG. 17. The manual movement of the lever 100 extends the two links 110 and 114 from the angular positions shown in FIG. 16 to the extended positions shown in FIG. 17.

The power cylinder 118 is then actuated to thrust the two interlocked links 110 and 114 upward, thereby to rotate the lever 100 to cause the upper jaw 95 to compress the stack of leaves arcuately to the desired configuration of a segment of an annulus. It is to be noted that, in the course of this compression operation, the leaves slide along the two guide ribs 92 and are thereby guided arcuately as required for the desired ultimate segment configuration. At the end of the compression operation shown in FIG. 18, the hook member 128 hangs free.

The power cylinder 118 is then actuated for retraction of the piston rod 116 to return the lever 100 to the position shown in FIG. 17, at which position the hook member 128 gravitates inwardly into engagement with the lower jaw 94, as shown. The small air cylinder 125 is then operated to extend the plunger 126 to kick the two links 110 and 114 back to their angular positions shown in FIG. 16. In consequence, the lever 100 is rotated counterclockwise from the position shown in FIG. 17 to the position shown in FIG. 16; and, with the hook member 128 in engagement with the lower jaw 94, the hook member swings the lower jaw upward to the position shown in FIG. 19. This final upward movement of the lower jaw 94 lifts the compressed segment clear of the side plates 90 and free of the two arcuate ribs 92 to make it convenient to remove the finished segment. The hook member 128 is then swung back to the retracted position shown in FIG. 16, with consequent release of the lower jaw 94 for gravitation of the lower jaw to its lower position to prepare the apparatus for repeating the operation with a new block of stacked leaves.

FIG. 20 shows a circular assembly plate 130 equipped with a central cylinder or mandrel 132. In preparation for the assembly of an annulus of the abrasive leaves, a previously mentioned cylindrical cardboard core 30 is slipped onto the mandrel 132, and a previously mentioned metal reinforcement ring 26 is placed on the assembly plate 130 concentrically of the mandrel.

As the compressed segments are removed from the jaws of the above-described apparatus, they are placed in sequence on the assembly plate 130, as shown diagrammatically in FIG. 22, with their inner ends abutting the core 30, as shown in phantom in FIG. 21. The radial faces of the compressed segments are coated with the adhesive resin to bond the assembled segments together. The cylindrical cardboard core 30 is precoated with the adhesive to cause the inner ends of the segments to be bonded to the core, and the reinforcement ring 26 is precoated with the adhesive to bond the ring to the segments when the segments are dropped in position, with the previously mentioned arcuate grooves 24 of the segments receiving the reinforcement ring.

When twelve of the segments are assembled progressively in this manner, a second reinforcement ring 28 is coated with adhesive and dropped, as indicated in FIG. 23, into engagement with the previously mentioned upper arcuate grooves 25 of the segments. The completed annulus is then lifted from the assembly plate, and final layers of the adhesive resin are placed on opposite sides of the annulus in the inner circumferential region, as indicated at 134 and 135 in FIG. 25. When all of the adhesive that is incorporated in the completed annulus is cured, the annulus is ready for service.

By way of example, the finished product may be an annulus with an outside diameter of 10 inches and with an inside diameter of 3⅞ inches, the inside diameter being the outside diameter of the cylindrical cardboard core 30. In such an annulus, the length of the individual abrasive leaves 20 is 3 1/16 inches. As heretofore stated, these relatively large diametrical dimensions result in a relatively low ratio of approximately 2.5 between the outer circumference and the inner circumference of the annulus, this low ratio making it possible to compress the segments sufficiently to accommodate a number of abrasive leaves exceeding by 10 to 20 percent the number that is equal to the inner circumference of the annulus divided by the initial thickness of the individual leaves.

Our description in specific detail of the presently preferred practice of the invention will suggest various changes, substitutions, and other departures from our disclosure within the spirit and scope of the appended claims.

We claim:

1. In a flap-type abrasive device for mounting on a rotary actuator, an array of radial flexible abrasive leaves bonded together in facewise abutment and forming a continuous annulus with a given inner circumference, the number of leaves exceeding by at least 10 percent the number equal to the given inner circumference divided by the thickness of the outer radial portions of the individual leaves, the array of leaves being circumferentially compressed in an inner circumferential zone to greater density than the density of the outer radial portions of the leaves, thereby to accommodate the excess within the given innner circumference.

2. An abrasive device as set forth in claim 1 in which said array comprises a circumferential series of segments, each segment comprising a pack of the leaves, each of the segments being individually compressed in its inner zone, the segments being in abutment with each other and being bonded together.

3. An abrasive device as set forth in claim 2 in which the individual leaves are notched in their opposite longitudinal adges and thus form circumferential grooves on the opposite sides of the annulus near the inner circumference of the annulus; and in which the reinforcement rings are seated in the two grooves respectively and are bonded to the annulus.

4. In a flap-type abrasive device for mounting on a rotary actuator, the combination of:

an array of radial flexible abrasive leaves packed together in facewise abutment with their inner ends interconnected and forming a continuous annulus with a given inner circumference, the number of leaves exceeding by at least 10 percent the number equal to the given inner circumference divided by the thickness of the outer radial portions of the leaves, the array of leaves being circumferentially compressed in the inner circumferential zone of the annulus to greater density than the density of the outer radial portions of the leaves to accommodate the excess within the given inner circumference, all of the abrasive faces of the leaves being directed in the same circumferential direction, all of said leaves being biased to bow longitudinally, the leaves of the array being arranged in successive pairs of oppositely bowed leaves.

5. An abrasive device as set forth in claim 4 which includes a cylindrical core fitted into the given inner circumference of the array and bonded to the array.

6. An abrasive device as set forth in claim 4 which includes two reinforcement rings imbedded respectively in the two opposite faces of the annulus and bonded to the annulus.

7. A flap-type abrasive wheel comprising a continuous annulus of radial flexible abrasive leaves with all of the abrasive faces of the leaves directed in the same circumferential direction and with the leaves arranged in successive pairs of oppositely bowed leaves, all of the leaves having die-cut notches in their opposite radial edges forming concentric circular grooves on the opposite sides of the annulus; and a pair of reinforcement rings mounted in said grooves respectively and bonded to the annulus.

8. An abrasive wheel as set forth in claim 7 in which said annulus has a given inner circumference and the number of leaves exceeds by at least 10 percent the number that is equal to the given inner circumference divided by the thickness of the outer radial portions of the leaves, the annulus of leaves being circumferentially compressed in an inner circumferential zone to greater density than the density of the outer radial portions of the leaves, thereby to accommodate the excess number of leaves in the given inner circumference.

9. An abrasive wheel as set forth in claim 8 in which said annulus comprises a circumferential series of precompressed segments, each segment comprising a pack of the leaves, the segments being in abutment with each other and being interconnected.

10. In a flap-type abrasive device for mounting on a rotary actuator, an array of radial flexible abrasive leaves packed together in facewise abutment with their inner ends interconnected and forming a continuous annulus with a given inner circumference, the number of leaves exceeding by at least 10 percent the number equal to the given inner circumference divided by the initial thickness of the leaves, the array of leaves being circumferentially compressed in the inner circumferential zone of the annulus to accommodate the excess number of leaves within the given inner circumference, said inner circumference being on the order of 4 inches and the length of the individual leaves being on the order of 3 inches.

11. A method of fabricating an annulus of a given inner circumference to function as a flap-type abrasive wheel, including the steps of:

assembling a series of flexible, abrasive leaves in facewise relation of substantially greater number than the given inner circumference divided by the thickness of the leaves;

arranging the series of leaves to lie radially of the desired inner circumference; and compressing the series of leaves circumferentially to conform to the desired inner circumference, to form a continuous annulus with an inner circumferential zone of greater density than the density of the outer ends of the individual leaves.

12. A method of fabricating an annulus of a given inner circumference to function as a flap-type abrasive wheel, including the steps of:
  assembling a given number of packs of leaves with the total number of leaves substantially exceeding a number equal to the given inner circumference divided by the thickness of the leaves prior to assembly;
  arcuately forming and compressing one end of each arcuately formed pack to an arcuate dimension substantially equal to the desired inner circumference divided by the given number of segments; and
  interconnecting the given number of the arcuately compressed packs to produce an array of radial abrasive leaves in the form of a continuous annulus of the desired inner circumference.

13. A method of fabricating an annulus of a given inner circumference to function as a flap-type abrasive wheel, including the steps of:
  forming leaves of flexible abrasive material with notches in the opposite edge of each leaf near one end thereof;
  assembling packs of the leaves with the notches in alignment near one end of each pack;
  arranging the leaves of each pack with the one end of the pack arcuately conforming to the given inner circumference and with the notches on each side of the pack forming arcuate grooves concentric to the given inner circumference;
  placing arcuate guides in sliding engagement with the two grooves respectively of each pack to maintain the concentricity of the pack relative to the given inner circumference;
  arcuately compressing each pack concentrically of the arcuate guides with the leaves slidingly engaged by the arcuate guides to maintain conformation of the pack with the given inner circumference; and
  assembling the compressed packs to form a continuous annulus having the given inner circumference.

14. A method of fabricating an annulus of a given inner circumference to function as a flap-type abrasive wheel, including the steps of:
  cutting flexible abrasive material to form ribbons of the abrasive material;
  die-cutting notches in the opposite longitudinal edges of the ribbon and severing the ribbon to form individual abrasive leaves, each having a pair of opposite notches near one end of the leaf;
  assembling packs of the leaves with the notches in alignment near one end of each pack;
  arranging the leaves of each pack with the one end of the pack arcuately conforming to the given inner circumference and with the notches on each side of the pack forming arcuate grooves concentric to the given inner circumference;
  placing arcuate guides in sliding engagement with the two grooves respectively of each pack to maintain the concentricity of the pack relative to the given inner circumference;
  arcuately compressing each pack concentrically of the arcuate guides with the leaves slidingly engaged by the arcuate guides to maintain conformation with the given inner circumference; and
  assembling the compressed packs to form a continuous annulus having the given inner circumference.

15. A method of fabricating an annulus of a given inner circumference to function as a flap-type abrasive wheel, including the steps of:
  forming two ribbons of sheet material with abrasive particles on one face of each ribbon and with the two ribbons biased to longitudinal curvature, the abrasive particles being on the convex face of one of the ribbons and being on the concave face of the other of the two ribbons, the abrasive faces of the two ribbons facing in the same direction;
  feeding the two ribbons simultaneously in face-to-face relation to die means by stages to cut notches in the opposite longitudinal edges of the two ribbons simultaneously at each stage and to shear off the two ribbons simultaneously at each stage to produce at each stage a pair of coextensive oppositely bowed abrasive leaves with a pair of opposite notches near one end of each leaf;
  assembling packs of the leaves with the notches in alignment near one end of each pack;
  arranging the leaves of each pack with one end of the pack arcuately conforming to the given inner circumference and with the notches on each side of the pack forming arcuate grooves concentric to the given inner circumference;
  placing arcuate guides in sliding engagement with the two grooves respectively of each pack to maintain the concentricity of the pack relative to the given inner circumference;
  arcuately compressing each pack concentrically of the arcuate guides with the leaves slidingly engaged by the arcuate guides to maintain conformation with the given inner circumference; and
  assembling the compressed packs to form a continuous annulus having the given inner circumference.

16. A method of fabricating an annulus of a given inner circumference to function as a flap-type abrasive wheel, including the steps of:
  assembling a given number of packs of leaves with the total number of leaves substantially exceeding a number equal to the given inner circumference divided by the thickness of the leaves prior to assembly;
  placing each stack between two diverging jaws;
  reducing the distance between said two jaws of the fixture by relative arcuate movement between the two jaws, thereby compressing each stack to the configuration of a segment of an annulus conforming to the given diameter; and
  assembling and interconnecting a series of the compressed segments to form a complete annulus.

References Cited by the Examiner
UNITED STATES PATENTS

| | | | |
|---|---|---|---|
| 2,843,469 | 7/1958 | Miller et al. | 51—297 |
| 2,913,857 | 11/1959 | Reed et al. | 51—334 |
| 3,016,294 | 1/1962 | Haywood | 51—297 |
| 3,099,113 | 7/1963 | Jeske | 51—334 |

ROBERT C. RIORDON, *Primary Examiner.*

LESTER M. SWINGLE, *Examiner.*